(12) United States Patent
Zacharias et al.

(10) Patent No.: US 7,540,133 B2
(45) Date of Patent: Jun. 2, 2009

(54) HYDRAULIC HOSE SUPPORT FOR AGRICULTURAL IMPLEMENTS

(75) Inventors: Darwin L. Zacharias, Saskatoon (CA); Henry Neufeld, Oslo (CA)

(73) Assignee: CNH Canada, Ltd. (CA)

( * ) Notice: Subject to any disclaimer, the term of this patent is extended or adjusted under 35 U.S.C. 154(b) by 144 days.

(21) Appl. No.: 10/232,533

(22) Filed: Sep. 3, 2002

(65) Prior Publication Data

US 2004/0050027 A1    Mar. 18, 2004

(51) Int. Cl.
*A01D 69/00* (2006.01)

(52) U.S. Cl. .................. 56/11.9; 56/14.9; 248/74.2

(58) Field of Classification Search ............... 248/75, 248/68.1, 62, 742, 74.2; 56/11.9, 14.9, 15.3, 56/15.5

See application file for complete search history.

(56) References Cited

U.S. PATENT DOCUMENTS

| | | | | |
|---|---|---|---|---|
| 2,361,943 A | * | 11/1944 | Issoglio et al. ............ | 174/135 |
| 2,394,240 A | * | 2/1946 | Harrison .................... | 248/68.1 |
| 2,489,119 A | * | 11/1949 | Burns, Jr et al. ........... | 248/68.1 |
| 2,626,552 A | * | 1/1953 | Oehler et al. ............... | 280/421 |
| 3,653,121 A | * | 4/1972 | Moriyama et al. .......... | 29/604 |
| 3,696,920 A | * | 10/1972 | Lahay ........................ | 206/370 |
| 4,244,544 A | * | 1/1981 | Kornat ...................... | 248/68.1 |
| 4,771,743 A | * | 9/1988 | McDowell ................ | 123/143 C |
| 4,775,121 A | * | 10/1988 | Carty ........................ | 248/68.1 |
| 6,378,279 B1 | * | 4/2002 | Smith et al. ................ | 56/15.5 |

FOREIGN PATENT DOCUMENTS

DE    4031226 A1  *  4/1992

* cited by examiner

Primary Examiner—Alicia M Torres
(74) Attorney, Agent, or Firm—Rebecca Henkel (57) ABSTRACT

An agricultural implement is provided that includes a wheeled frame and a draft tongue pivotally connected to and extending forwardly from the frame to connect with the tractor. A hydraulic cylinder controls the pivotal movement of the draft tongue relative to the frame. A hydraulic conduit system having at least one flexible hose provides a source of hydraulic fluid under pressure from the tractor to the hydraulic cylinders. A hydraulic hose support is mounted at the forward end of the draft tongue to support the flexible hoses. The hose support includes a vertical support, a base portion that defines a curved portion and that is affixed to the vertical support, and an elastomeric block having openings therein to receive and fix the flexible hoses to the hose support.

1 Claim, 7 Drawing Sheets

HYDRAULIC HOSE SUPPORT FOR AGRICULTURAL IMPLEMENTS

FIELD OF THE INVENTION

The present invention relates generally to hydraulically operated farm implements. In particular, this invention relates to a support for hydraulic hoses carried by the tongue of a pull-type agricultural implement.

BACKGROUND OF THE INVENTION

Pull-type agricultural implements have been utilized for various harvesting operations for many years. These implements, supported primarily by ground engaging wheels, are made in a variety of configurations, but normally include components supported on a frame. One of these components is a pivotal draft member, commonly called a drawbar or a draft tongue. For convenience, any draft member discussed in the following description will be referred to as a draft tongue.

For example, in pull-type harvesting implements, the draft tongue is pivotally mounted to the frame and is connected at the forward end to a tractor that provides both motive power and operational power to operate the crop harvesting header. The tractor also provides a source of hydraulic fluid under pressure from a conventional on-board hydraulic system carried by most modern tractors. The hydraulic fluid is needed to provide operative power for hydraulic components on the harvesting implement. The pivotal movement of the draft tongue is controlled by a hydraulic swing cylinder interconnecting the frame and the rearward portion of the draft tongue, which is powered hydraulically by the tractor. Further, hydraulic lift cylinders and hydraulic tilt cylinders, control the height and pitch of the crop harvesting header relative to the ground.

Hydraulic fluid is typically transported to and from the implement via a hydraulic conduit system that includes at least one flexible hose extending from the forward end of the draft tongue to the tractor. The flexible hoses are typically supported on a fixed support that extends forwardly and vertically from the top of the draft tongue. Various methods have been devised to support the hoses from the draft tongue and above the power-take-off driveline (PTO).

Figure 1:
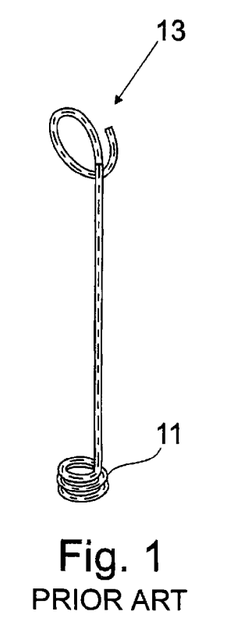
FIG. 1 is a perspective view representing a spring-like hose support of the prior art.

As shown in FIG. 1, one system commonly used to hold and bundle the hydraulic hoses is a vertically standing spring with a curved opening at the top (i.e., a "pig-tail"). In this design, the base of the spring 11 is fixed to the draft tongue (not shown) and the hydraulic hoses (not shown) are passed through the curved opening 13 at the opposing end of the spring. Although this design has the advantages of being simple and inexpensive, there is at least one distinct disadvantage in that because the hoses are not clamped to a surface, the hoses rub against each other and against the support during operation and transport of the implement, thereby causing premature wear of the hydraulic hoses. Furthermore, this design does not allow for any sort of arrangement of the hoses. As the number and size of the hydraulic hoses increases, the holder becomes incapable of holding all of the hoses and it becomes increasingly difficult to load and exchange the hoses. Moreover, the spring is incapable of holding the weight of numerous hoses and tends to fall over if too many hoses are inserted through the "pig-tail" opening.

Figure 2A:
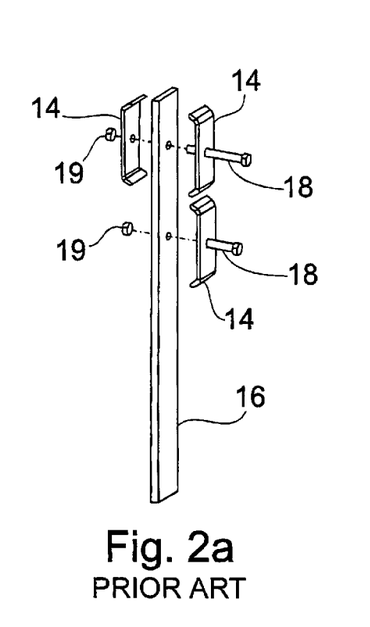
FIG. 2a is an exploded perspective view representing a rigid hose support of the prior art.
Figure 2B:
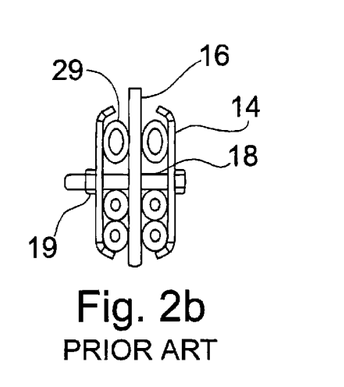
FIG. 2b is an enlarged partial elevational view of the hose support of FIG. 2a depicting the deformation of the hydraulic hoses.
Figure 2C:
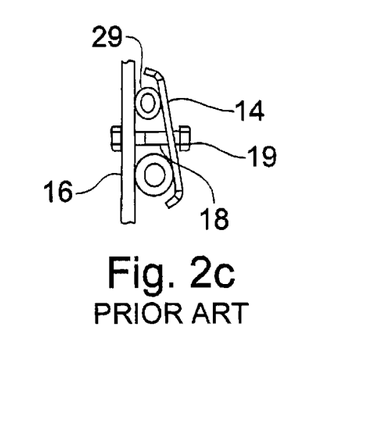
FIG. 2c is an enlarged partial elevational view of the hose support of FIG. 2a depicting the inability of the hose support to clamp two different size hoses.

Another design that has been used in the industry is illustrated in FIG. 2a. In this design, the hydraulic hoses (not shown) are clamped between a bracket 14 and stand 16, which is typically a flat piece of steel. The bracket 14 is held onto the flat piece of steel by a nut 19 and bolt 18. Although this system permits the hydraulic hoses 29 to be tightly clamped, the clamping force is applied to only a small area of the hose, which tends to deform the hose, as is shown in FIG. 2b. Furthermore, arrangement of the hoses 29 is difficult with this design because different sizes of hoses require separate clamping sections. As depicted in FIG. 2c, when two different sizes of hoses are clamped in the same section, the pressure applied to the hoses is uneven. Consequently, this design does not permit a smaller hose to be clamped under the same bracket as a larger hose. The use of steel is also disadvantageous in that it causes premature wear of the hydraulic hoses. Depending on the hardware used (e.g., nuts and bolts), changing the hoses can be a tedious, time-consuming procedure.

Figure 3:
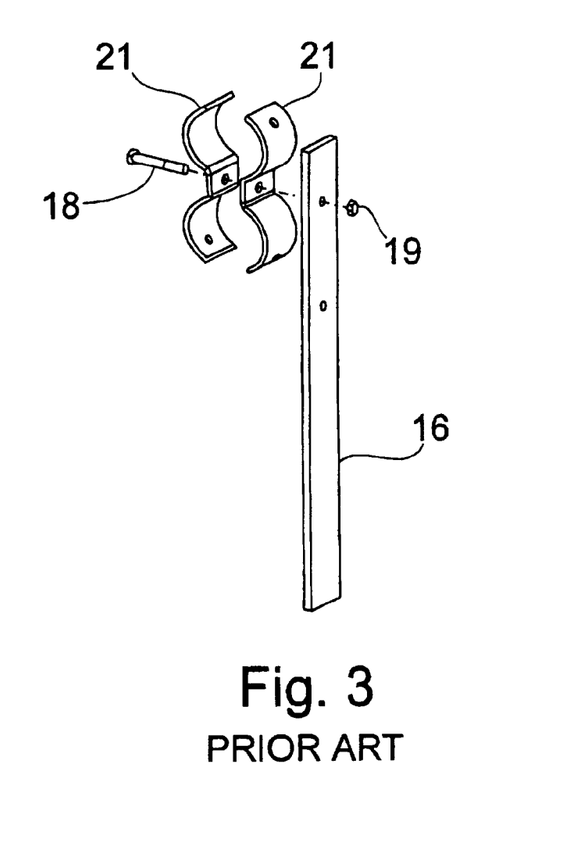
FIG. 3 is an exploded perspective view representing a clamping hose support of the prior art.

Formed clamping devices such as the one illustrated in FIG. 3 have also been used. In this design, curved brackets 21 are affixed to a stand 16 (e.g., a flat piece of steel) by a nut 19 and a bolt 18. The brackets 21 are preferably formed in a manner such that they fit together to provide a circular opening through which the hydraulic hoses are placed. The brackets 21 are then bolted to the stand 16. These formed clamping devices tend to clamp the hose more uniformly over a larger area of the hose circumference; however, this design still causes significant wear of the hydraulic hoses, even if the clamps are rubber-coated. Furthermore, for larger numbers of hoses, which is typical of many seeding implements, this design becomes very expensive and is therefore undesirable.

Figure 4:
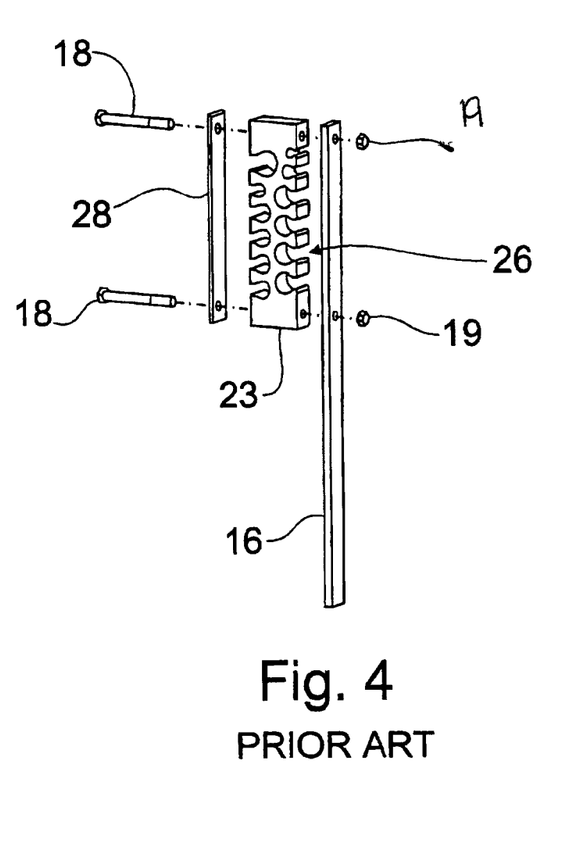
FIG. 4 is an exploded perspective view representing a rigid hose support of the prior art incorporating an elastomeric block.

FIG. 4 illustrates another attempted design, namely a polyurethane block 23 with key-ways 26 cut into both sides of the block. The block 23 can be attached to a stand 16 mounted to the forward end of the draft tongue (not shown). A steel plate 28 is generally affixed to the block 23 on the side of the block opposing the stand 16 to hold the hoses in the key-ways. The block 23 can be mounted to the stand 16 by any conventional manner, e.g., by a nut 19 and a bolt 18. The theory behind this design is that when the hydraulic hoses are inserted into the key-ways 26, the block 23 will become stiff and clamp the hoses. However, the size of the holes cut into the block does not allow for variations in hose diameter which can be experienced between hoses from different suppliers. Furthermore, due to the different sizes of the hoses, some hoses are clamped tightly by the block while others are not. Attempting to tightly clamp the smaller hoses deforms the larger hoses in a similar fashion to that shown in FIG. 2b. Pulling on the hydraulic hoses, such as by activating the hydraulic swing cylinder and pivoting the draft tongue, e.g., swinging the farm implement to the side of the tractor, increases the bending action of the flexible hoses, causing the polyurethane block 23 to twist and bend. This severe bending action causes a crimp in the flexible hoses, which results in a constriction of the opening in the flexible hoses, an increased pressure inside the hoses, and overall wear and tear of the hydraulic hoses.

Accordingly, it is desirable to provide a hose support for hydraulic hoses carried by the tongue of a pull-type agricultural implement that overcomes the disadvantages of the prior art.

SUMMARY OF THE INVENTION

Accordingly, an important object of the present invention is to provide a hose support for hydraulic hoses that overcomes the above-mentioned problems encountered in the prior art.

It is another object of this invention to provide an agricultural implement that provides a hydraulic hose support affixed to the frame of the implement.

It is a feature of this invention that the hose support includes a curved base portion around which an elastomeric block is compressed.

It is yet another feature of this invention that the hose support includes openings or keyways cut into an elastomeric block that fixes the hoses to the hose support.

It is a further feature of the present invention that the hose support arranges the hoses by size and/or hydraulic circuit in a neat and orderly fashion.

It is another feature of this invention that the hoses are clamped with a force sufficient to eliminate motion between the hoses but not deform the hoses.

It is still another feature of this invention that the hose support elevates the flexible hydraulic hoses above the power-take-off driveline (PTO).

It is a further feature of the present invention that the elastomeric block is affixed to a curved base.

It is an advantage of the present invention that the polyurethane material of the elastomeric block provides a tough, pliable connection to the hydraulic hoses.

It is another advantage of this invention that hydraulic hoses used to connect pull-type agricultural implements to a tractor will have a longer life.

It is a further advantage of this invention that the hose support allows for easy insertion or removal of hydraulic hoses.

It is yet another advantage of this invention that the hose support provides easy access from the holding fixtures to the tractor couplers.

It is another advantage of this invention that hydraulic hoses can be changed with minimal effort.

It is still another feature of this invention to provide a hose support for a pull-type agricultural implement which is durable in construction, inexpensive to manufacture, easy to maintain, easy to assemble, and simple and effective in use.

These and other objects, features, and advantages are accomplished according to the present invention by providing an agricultural implement operatively connected to a tractor to receive operative power therefrom. The implement includes a wheeled frame and a draft tongue pivotally connected to the frame and extending forwardly from the frame to connect with the tractor. A hydraulic cylinder interconnects the frame and the draft tongue to control the pivotal movement of the draft tongue relative to the frame. Other a hydraulic cylinders control the height of the frame and the cutting angle thereof relative to the ground. A hydraulic conduit system containing at least one flexible hose extending from the forward end of the draft tongue to the tractor and provides a source of hydraulic fluid under pressure from the tractor to the hydraulic cylinders to control the operation thereof. A hydraulic hose support is mounted on the forward end of the draft tongue to support the flexible hoses. The hose support includes a vertical support, a base portion defining a curved portion and being affixed to the vertical support, and an elastomeric block having openings therein to receive the flexible hoses and fix the hoses to the hose support.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENTS

Figure 5:
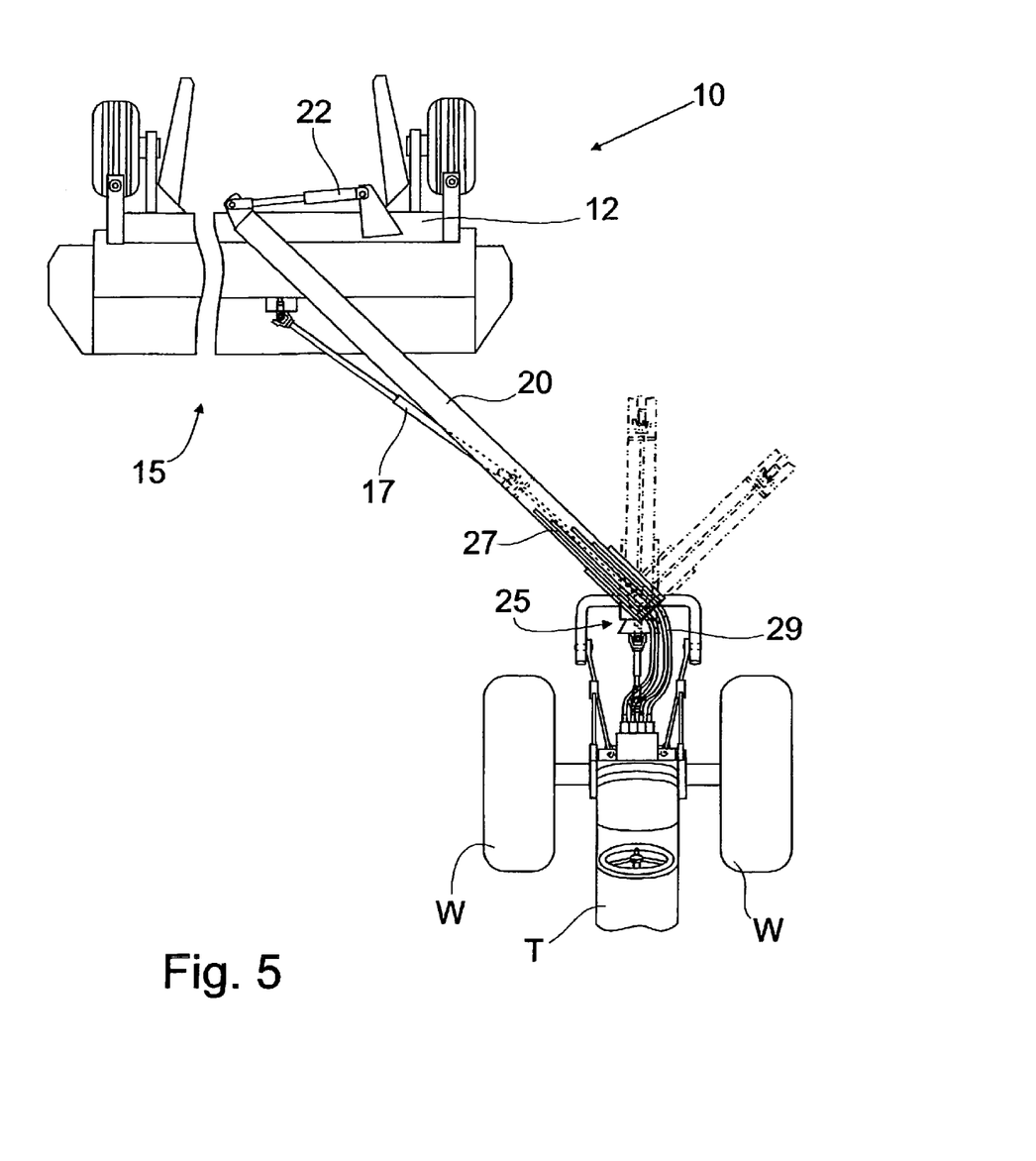
FIG. 5 is a top plan view representing a hay harvesting implement incorporating the principals of the instant invention, the implement is connected to a tractor to provide operative power thereto, the movement of the draft tongue being depicted in phantom, portions of the tractor and the implement being broken away for purposes of clarity.
Figure 6:
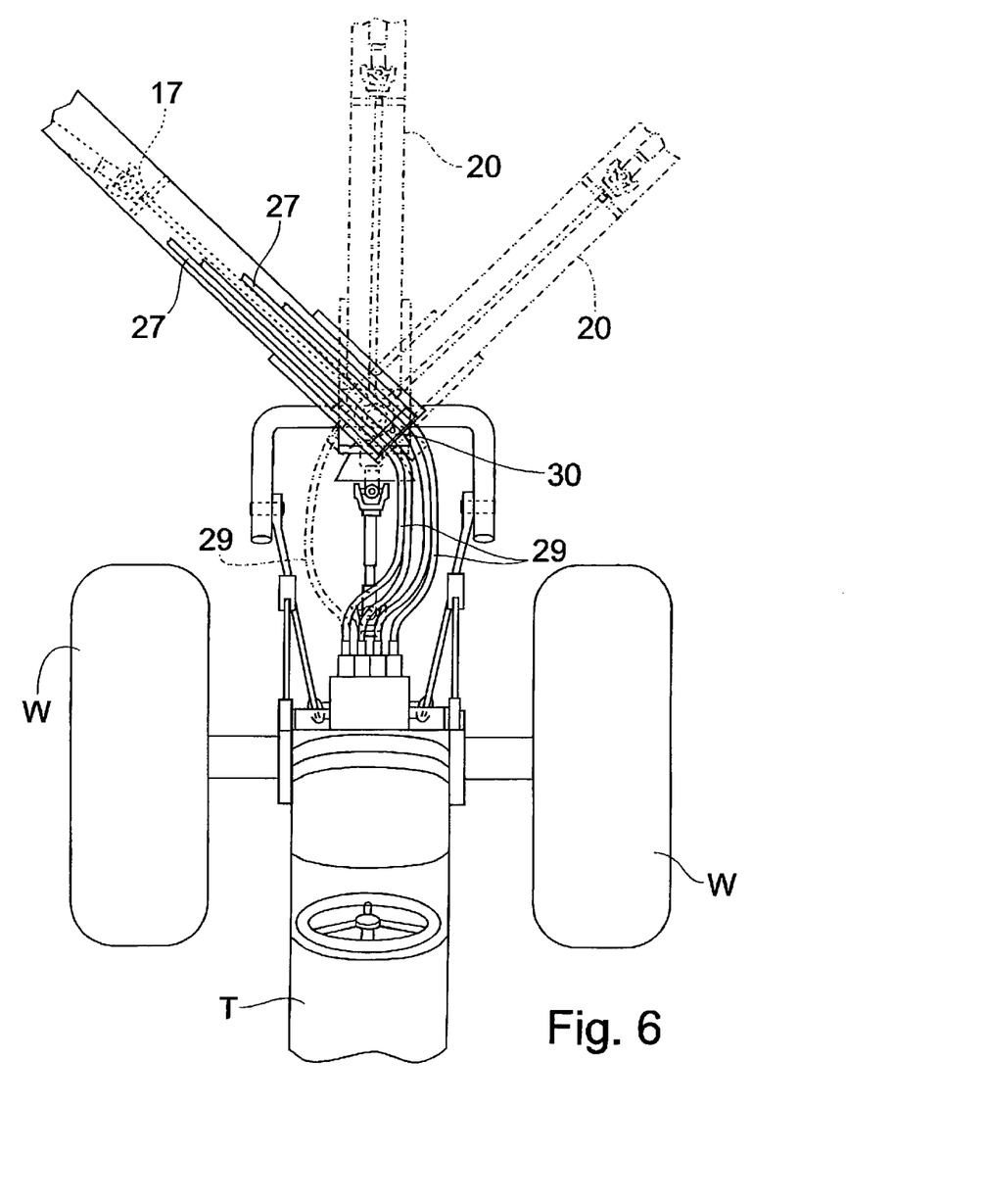
FIG. 6 is an enlarged partial top plan view similar to that of FIG. 5, showing the connection of the draft tongue to the tractor.

Referring to FIGS. 5 and 6, a mower-conditioner incorporating the principles of the instant invention can be seen. The mower-conditioner 10, exemplary of pull-type agricultural implements, which could include air seeders, planters and other types of agricultural implements, includes a wheeled frame 12 adapted for movement over the field to harvest hay crop. A crop harvesting header 15 is mounted on the forward portion of the frame 12 to engage standing crop material, sever the crop material from the ground, and further harvest the severed crop material by conditioning the hay crop before discharging the conditioned crop to the ground behind the wheeled frame 12.

Pull-type agricultural implements 10 utilize a draft tongue 20 that is pivotally mounted at the rearward end thereof to the frame 12 and connected at the forward end thereof to a tractor T that provides both motive power and operational power to operate the crop harvesting header 15. The tractor T also provides a source of hydraulic fluid under pressure from a conventional on-board hydraulic system carried by most modern tractors T. The hydraulic fluid under pressure is needed to provide operative power for hydraulic components on the implement 10. For example, the pivotal movement of the pivoted draft tongue 20 is controlled by a hydraulic swing cylinder 22 interconnecting the frame 12 and the rearward portion of the tongue 20. Other conventional examples of hydraulically controlled components include hydraulic lift cylinders that control the height of the crop harvesting header 15 relative to the ground and a hydraulic tilt cylinder that interconnects the frame 12 and the top of the crop harvesting header 15 to control the pitch of the header relative to the ground.

The implement 10 is typically provided with a hydraulic fluid conduit system 25 including hoses 29 interconnecting the on-board tractor hydraulic system and the hydraulic components 22 of the implement 10 to provide flow communication therebetween. Typically, the conduit system 25 includes fixed length pipes 27 mounted on top of the draft tongue 20.

Flexible hoses 29 are typically connected to the ends of the pipes 27 to provide appropriate flow communication connection at each respective end of the pipes 27. An alternative configuration would be for the flexible hoses 29 to extend over top of the draft tongue 20, eliminating the fixed length pipes.

As discussed above, the existing methods to hold the hydraulic hoses 29 have many deficiencies. The hose support of the present invention provides an improved hose support for the assemblage of the hydraulic hoses above the PTO. Referring now to FIGS. 5-6, the details of the hose support 30 can best be seen. The hose support 30 is mounted on a support portion 33, such as by welding, to the forwardmost end of the draft tongue 20. Alternatively, the hose support can be mounted to the hitch of the implement 10. The hose support 30 includes a base portion 36 defining a generally curved portion 37. An elastomeric block 32 having openings 38 to receive hydraulic hoses (not shown) formed on one side therein is pivotally attached to the curved portion 37 of the base portion 36. Preferably the block 32 is formed of a polyurethane material. The block 32 is compressed around the curved portion 37 and is held in place by any suitable means, such as, for example, nuts 19 and bolts 18 or a latch 34 affixed to the end of the base opposite the pivotal connection of the block 32 to the base portion 36. Other suitable examples would be easily identified by one of ordinary skill in the art. Optionally, a flexible metal strip 39 is affixed to the top of the block 32 to provide added support to the flexible hoses 29.

Figure 7:
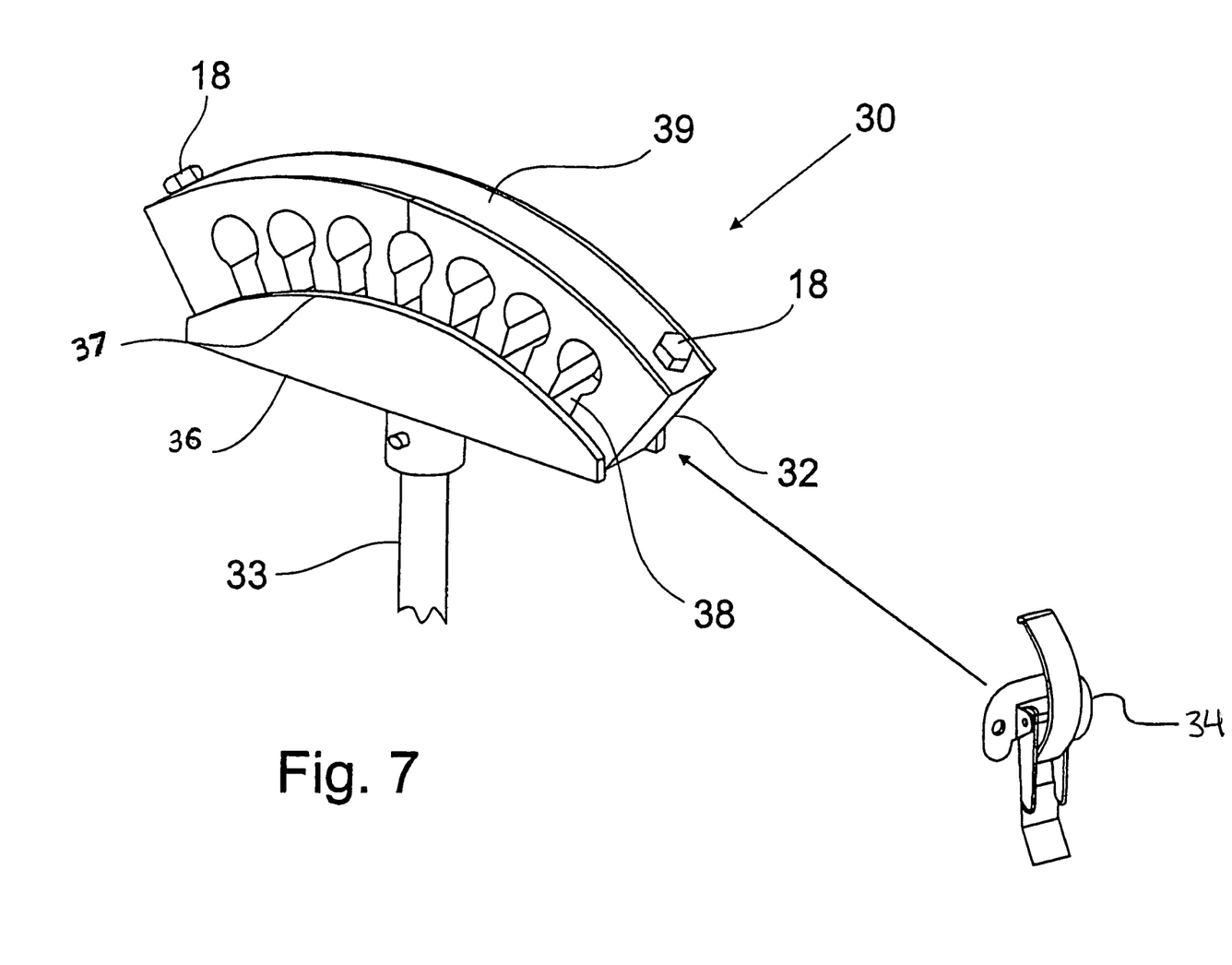
FIG. 7 is a perspective view of a hose support incorporating the principles of the present invention.
Figure 8:
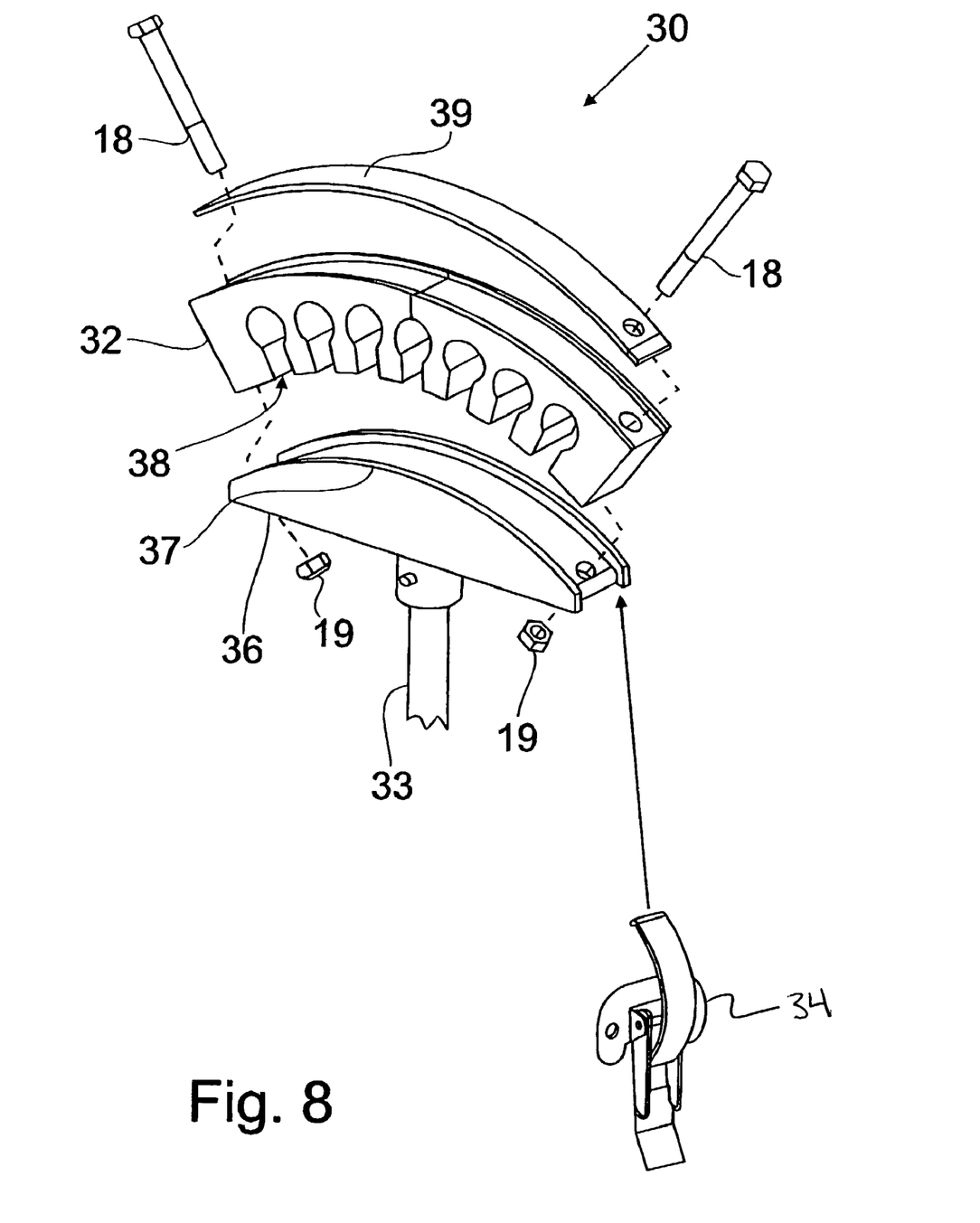
FIG. 8 is an exploded perspective view of the hose support shown in FIG. 7.
Figure 9:
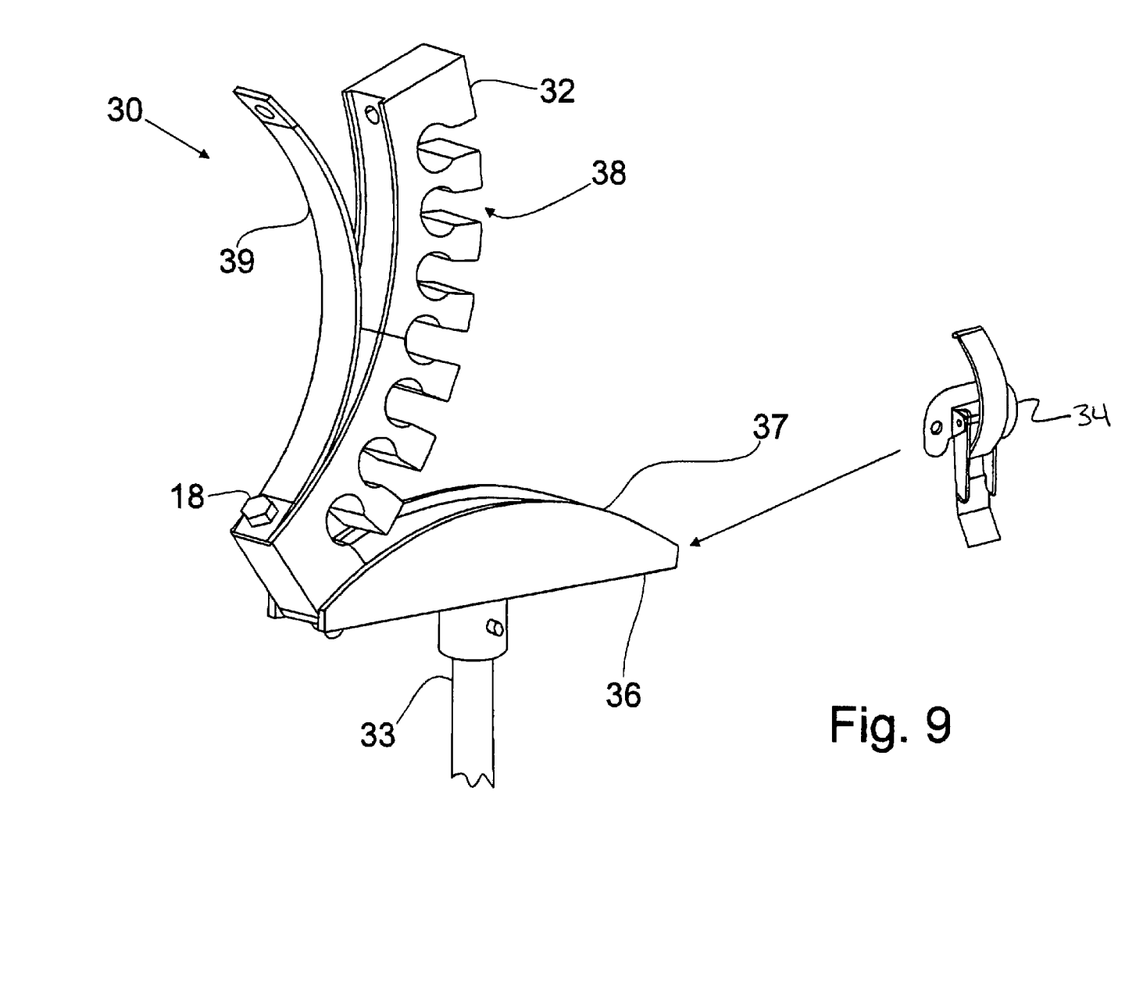
FIG. 9 is a perspective view of the hose support depicted in FIG. 7 in an open configuration.

In the embodiment depicted in FIGS. 7-9, the support portion 33 projects upwardly from the draft tongue 20. This keeps the flexible hoses 29 high enough to clear the power-take-off driveline (PTO) while also allowing them to follow the tractor T. Additionally, the upward positioning of the support portion 33 of the hose support 30 allows for more hose length and therefore a greater angle of the draft tongue 20 relative to the tractor T.

In a preferred embodiment, any unused openings 38 are plugged (not shown) to keep the clamping force on the hoses 29 uniform throughout the block 32. By placing plugs into the unused openings 38, a more uniform clamping force throughout the block 32 will be achieved.

Of the many implicit and explicit advantages of the present invention, one of the most important is the uniform and tight clamping of the hoses 29 in the block 32 without any deformation of the hoses 29. By compressing the elastomeric block 32 around the curved portion 37 of the base 36, the hoses 29 are clamped with a force sufficient to eliminate motion between the hoses, which increases the operative life of the hoses 29. Another advantage of the instant invention is that the openings 38 can be of any number of sizes to accommodate the differences in hose diameters between suppliers. Moreover, the openings 38 will collapse until they encounter a hose surface, thereby ensuring a secure fit around the hoses 29. The openings 38 in the hose support 30 arranges the hoses by size and/or hydraulic circuit in a neat and orderly fashion.

In addition, the hydraulic hoses 29 in the hose support 30 can be changed with minimal effort. As shown in FIG. 7, the block 32 can be pivoted away from the base 36, thereby exposing openings 38. The hoses 29 can then be easily inserted or removed from the openings 38. Afterwards, the block 32 is compressed onto the base 36 and secured by any one of the means discussed above.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of supporting at least one flexible hydraulic hose from a tongue of an implement, the method comprising the steps of:

providing an elastomeric block and a hose support mounted to the tongue of the implement, the hose support including a base portion that defines a curved portion;

inserting a fastener through the elastomeric block;

pivotally connecting a first end of the elastomeric block via the fastener against the curved portion of the base portion;

inserting the at least one flexible hydraulic hose through one of a plurality of openings in the elastomeric block;

compressing the elastomeric block against the curved portion of the base portion; and fastening a second end of the elastomeric block to the curved portion of the base portion.

* * * * *